239-654 SR
11/4/86 OR H 000,151

United States Statutory Invention Registration [19]

[11] Reg. Number: H151
[43] Published: Nov. 4, 1986

Rouse et al.

[54] POWDERY CLOUD DISPERSER

[75] Inventors: William G. Rouse, Aberdeen; Jacob Sofinowski, Baldwin; Ronald J. Morin, Bel Air, all of Md.

[73] Assignee: The United States of America as represented by the Secretary of the Army, Washington, D.C.

[21] Appl. No.: 677,623

[22] Filed: Dec. 3, 1984

[51] Int. Cl.[4] ..... A01C 3/06
[52] U.S. Cl. ..... 239/654; 239/143
[58] Field of Search ..... 239/654, 655, 143, 346, 239/8; 406/136, 137, 142; 222/630

[56] References Cited

U.S. PATENT DOCUMENTS

| | | | |
|---|---|---|---|
| 197,601 | 11/1877 | Cassidy | 406/136 |
| 1,090,280 | 3/1914 | Coldiron | 239/654 |
| 1,276,653 | 8/1918 | Herbert et al. | 406/136 |
| 2,125,251 | 7/1938 | Thompson | 239/654 |
| 2,219,208 | 10/1940 | Knight | 406/142 |
| 2,657,339 | 10/1953 | Hampe | 239/654 |
| 4,449,644 | 5/1984 | Matson | 406/137 |

*Primary Examiner*—Harold J. Tudor
*Attorney, Agent, or Firm*—Anthony Lane; Robert Gibson; Edward F. Costigan

[57] ABSTRACT

A disperser of a powdery cloud which may be used to defeat infra-red sensors used by enemy forces and an arrangement which will effectively and efficiently produce a cloud of powder for military applications.

The disperser is provided with a barrel containing powder to which a cover is secured. The cover has an axial opening provided with an upper and lower cylindrical pipe section communicating therewith. A hollow elbow-like pysi is also secured to a second opening in the cover. Air is forced into the upper cylindrical pipe and travels down through the lower cylindrical pysi into the powder. This forced air carries the powder up to the elbow-like pipe and out into the atmosphere as a powdery cloud. Control of the dispersion process is by means of two slide-valves provided on the upper cylinder pysi.

3 Claims, 2 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

POWDERY CLOUD DISPERSER

GOVERNMENTAL INTEREST

The invention described herein was made in the course of or under a contract or subcontract thereunder with the Government and may be manufactured, used and licensed by or for the Government for Governmental purposes without payment to us of any royalties thereon.

BACKGROUND OF INVENTION

Field of Use

This invention relates to a disperser of a powdery cloud for military applications.

More particularly, this invention relates to a powder disperser for use in concealment of a target.

Smoke clouds are known to conceal targets from enemy view. However, although they cannot be penetrated by optics, television, image intensification and near infra-red devices, they may be penetrated by devices using the far infra-red spectrum. Protection from the far infra-red spectrum can only be accomplished by a cloud of powder.

What is needed is a dispersing arrangement which will effectively and efficiently produce a cloud of powder for military applications.

In one attempt to design the needed arrangement, an inverted hopper having an inlet port which could be provided with a forced-air supply, and an exhaust post for the provision of a dispersing cloud of powder was attached to the top of a drum containing powder. The drum was then turned upside down in order to provide a gravitational supply of powder to the air-stream when the forced air was supplied to the system. However, the ports became clogged, and the arrangement was totally unsatisfactory for military use in providing an effective and efficient cloud to defeat enemy sensors.

In a further attempt, a hopper was attached to the exhaust pipe of a forced-air generator. In this manner, powder was dispersed into the air-stream in a continuous manner. However, the cloud produced by this method was much smaller, and a large portion of the powder fell to the ground within 50 yards of the hopper.

In a still further attempt, a ring and a collapsible tube was designed to lay on top of the powder in the drum. An air-jet was directed from a blower directly into the powder for maximum effect. The collapsible tube allowed the ring to follow the powder as the drum was emptied. The ring performed satisfactorily in directing the air into the powder but the drum tipped over as it was emptied. To regain full powder flow, the drum had to be physically righted which was very tedious and time-consuming.

It is an object of this invention to provide a powdery cloud for military applications.

Another object is to provide a disperser of a powdery cloud which may be used to defeat infra-red sensors used by enemy forces.

A further object is to provide an apparatus which may be used on a continuous basis to produce a cloud for military use in an effective and efficient manner.

A still further object is to provide an apparatus which can continuously disperse powder into a cloud in an effective and efficient manner.

Other objects and many of the attendant advantages of this invention will become better understood from a reading of the following detailed specification with accompanying drawing wherein.

Figure 1:
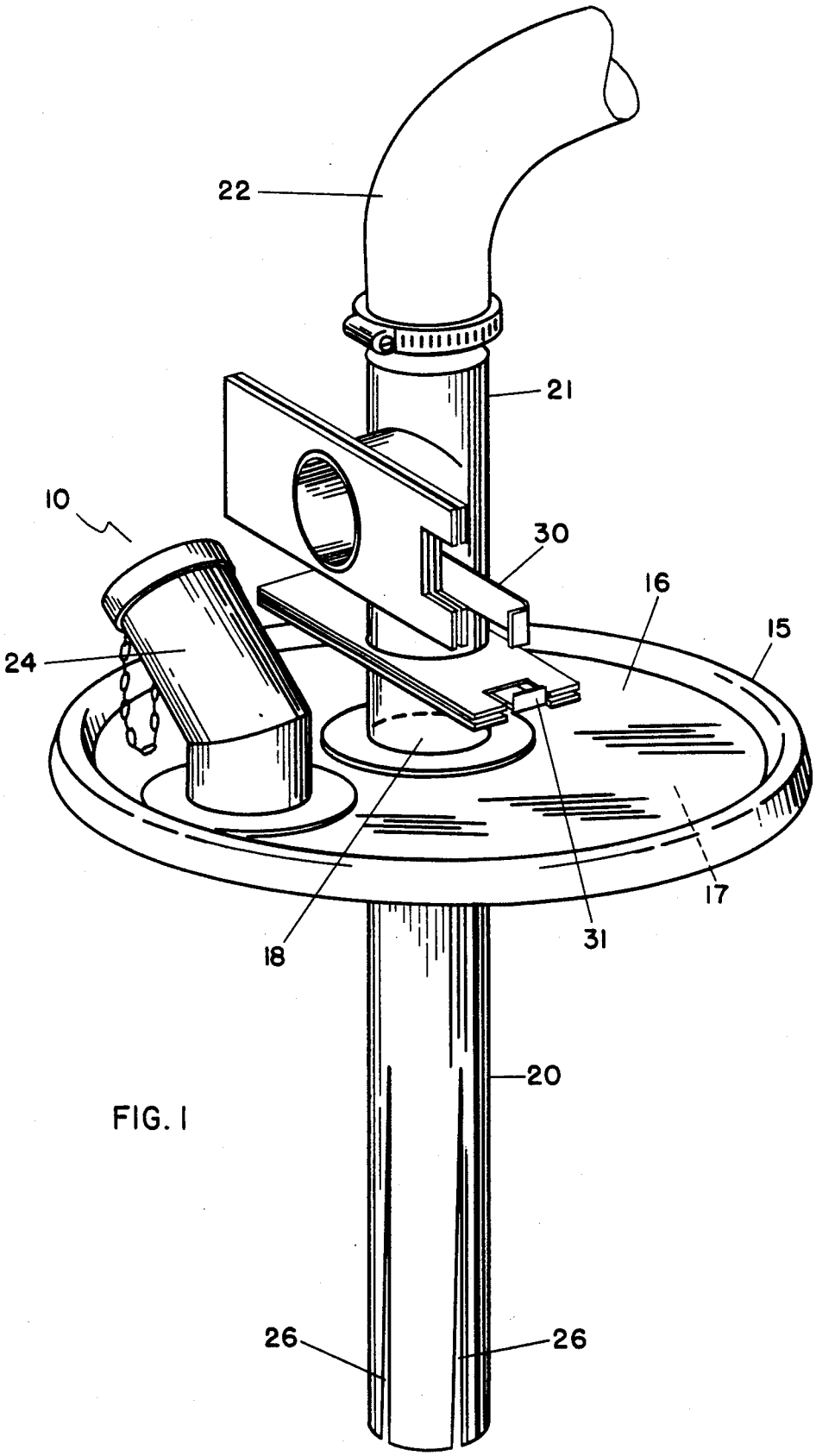
FIG. 1 is a view showing the apparatus of this invention.
Figure 2:
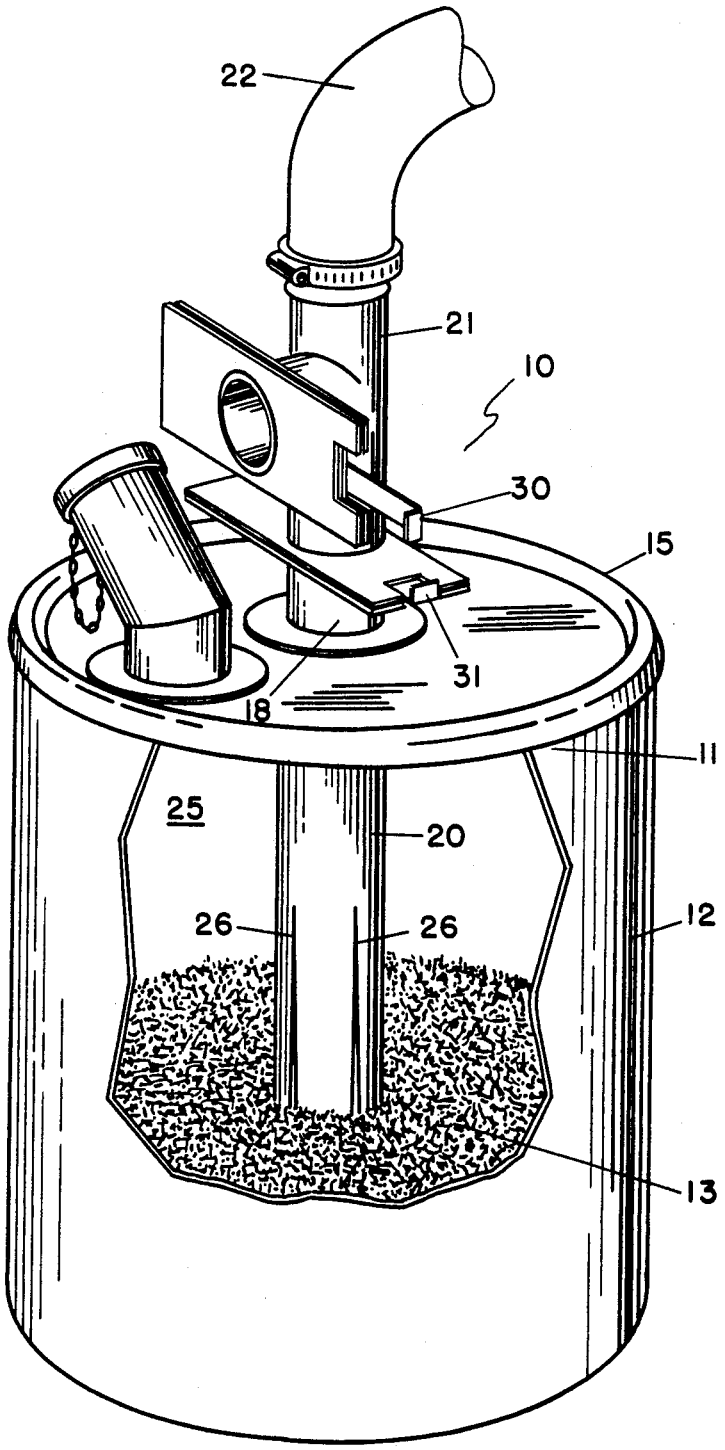
FIG. 2 is a view showing the present apparatus attached to a barrel contain powder.

Referring to FIGS. 1 and 2, an apparatus 10 is shown for use in dispersing a cloud of powder in an effective and efficient manner in military operations to defeat penetration by enemy infra-red sensors of a concealed target.

The apparatus 10 is separably mounted on top of the open end 11 of a drum or barrel 12 containing the powder 13 desired to be dispersed. The base of the apparatus is a cover 15 having a top 16 and bottom surface 17 and an axial opening 18. A first hollow elongated pipe or cylinder 20 is provided communicating with the axial opening 18 while a second communicating pipe 21 is fitted on the upper side of the cover 16 in communicating relationship to the axial opening 18 and the first hollow cylinder 20. The second cylinder 21 is adapted to receive a flexible hose 22 which communicates in operative fashion with a conventional forced-air generator (not shown). An outlet tube 24 in the form of a hollow elbow having a 45° angle is provided on the cover and communicates with air-space 25 above the powdery mass 13. The first cylinder or pipe 20 is provided with elongated slits 26 along its longitudinal length. The slits 26 each communicate between the first hollow cylinder 20 and the powdery mass 13 for the provision of forced-air to the powder 13 in the drum or barrel 12. The powder 13 is carried by the forced-air in an upwardly direction and exits through the outlet tube 24 or elbow in the form of a cloud. However. it has been found that the dispersion rate is a function of both the air-flow and the powder to be dispersed.

In operation, the by-pass slide-valve 30 is closed, the inlet slide-valve 31 is open, and forced-air from a generator (not shown) is introduced into the inlet-tube 20 means of a flexible hose 22. The air enters the inlet tube 20 and travels through the length thereof until it exits into the powdery mass 13 through the plurality of slits 26. The powder 13 is carried up and exits through the outlet tube 24 in the form of a powdery cloud. Directional guidance aay be given to the cloud through the use of a flexible hose which may be secured to the outlet tube. It has been found that a dispersion rate of 10 pounds per minute may be maintained which is substantially efficient in producing an effective cloud for military use of satisfactory duration. The cloud produced will defeat the penetration of infra-red sensors.

For excellent results, the powder may be talc, lime, or fly ash having a particle size of 50$\mu$ or less.

The foregoing disclosure and drawings are merely illustrative of the principles of this invention and are not to be interpreted in a limiting sense. We wish it to be understood that we do not desire to be limited to the exact details of construction shown and described because obvious modifications will occur to a person skilled in the art.

What is claimed is:

1. A disperser of a powdery cloud consisting essentially of:

a barrel having an open-end construction and containing powder, a cover separably engaged to said open-end having a top and bottom surface with an axial opening passing therethrough, a first hollow elongated cylinder having a first and second open end, said first end secured to said bottom of said cover communicating with said axial opening, said elongated cylinder provided with a plurality of elongated slits extending into said powder, a second hollow cylinder having a first and second end of open construction, said first end of said second cylinder secured to said top surface of said cover in axial alignment to said opening of said cover, a hollow elbow having a first and second end of open construction, said first end of said elbow secured to said cover and communicating with said barrel, forced air means for conveyance of powder secured to said second end of said second cylinder, whereby, forced air enters said second end of said second cylinder and flows through said cover into said first elongated cylinder and thence through said slits to said powder carrying said powder up and through said first end and thence through said second end of said elbow out to the atmosphere in the form of a powdery cloud.

2. The disperser of claim 1 wherein said second cylinder is provided with a slide-valve adjacent the top surface of said cover to control an.

3. The disperser of claim 2 wherein said second cylinder is provided with a communicating hollow cylindrical extension transverse the axial bore of said second cylinder, said extension provided with a second slide-valve.

* * * * *